Aug. 22, 1933.  T. R. HARLAN  1,923,975

WHEEL FOR VEHICLES AND AIRPLANES

Filed March 8, 1932

INVENTOR
Thomas R. Harlan
BY Munn & Co.
ATTORNEYS

WITNESSES

Patented Aug. 22, 1933

1,923,975

UNITED STATES PATENT OFFICE 1,923,975

WHEEL FOR VEHICLES AND AIRPLANES

Thomas R. Harlan, Tompkinsville, N. Y.

Application March 8, 1932. Serial No. 597,538

1 Claim. (Cl. 152—29)

An object of the invention is to provide a disc wheel, the discs at the sides of the wheel enclosing an air space having communication with the interior of the inner tube of a pneumatic tire.

Another object of the invention is to provide the inner tube with gasket flaps which fit between the disc sides of the wheel and an inner ring to prevent the escape of air between the inner tube and the interior of the disc wheel. Offset rings are provided to fit the shoe and the offset rings, the discs and the flaps are held together at the inner ring by means provided.

A further object of the invention is to provide the inner tube with a recess in which is disposed a puncture-proof pad.

The invention also comprehends a puncture-proof pad formed by a plurality of blocks of material which are molded and which are fitted in the recesses in the inner tube.

Additional objects of the invention will appear in the following specification in which the preferred form of the invention is described.

Figure 1:
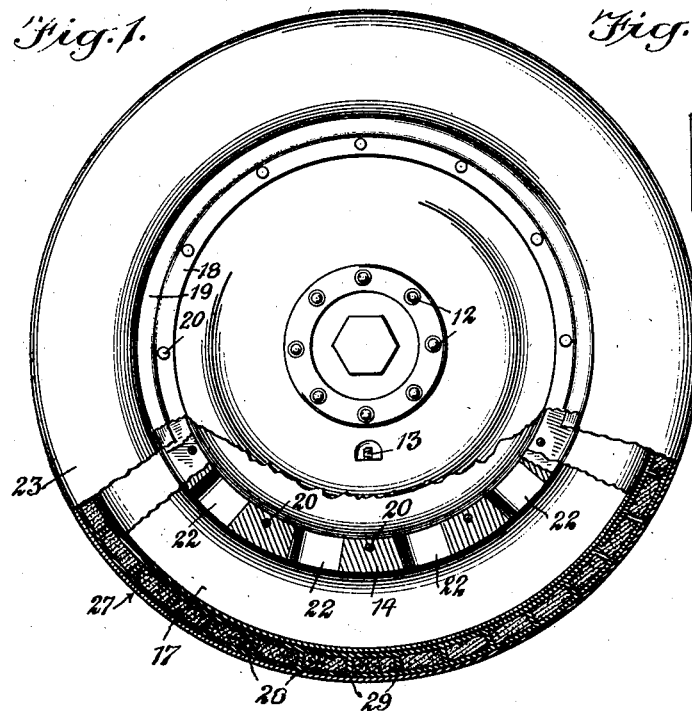

In the drawing similar reference characters refer to similar parts in all the views, of which Figure 1 is a side elevation of the wheel which is the subject matter of this application, parts being broken away to illustrate the construction.

Figure 2:
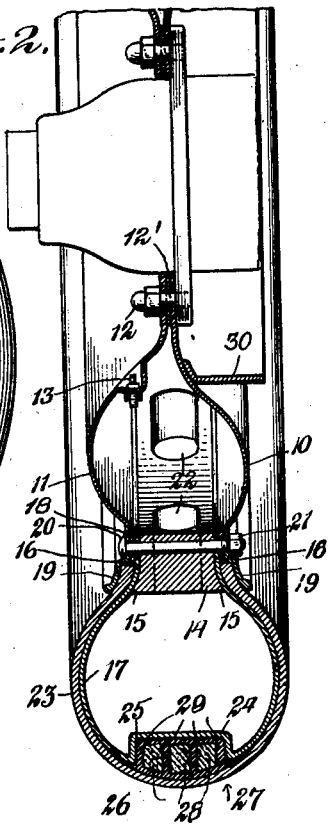
Figure 3:
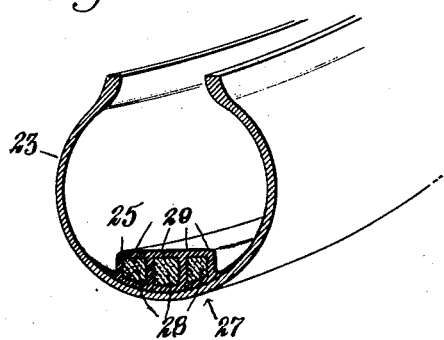
Figure 4:
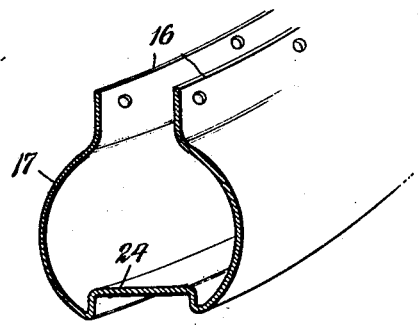

Figure 2 is a fragmentary sectional view illustrating the construction of the wheel, Figure 3 is a perspective view illustrating in section the construction of the shoe, and Figure 4 is a perspective view illustrating in section the construction of the inner tube.

By referring to the drawing it will be seen that the wheel is provided with an inside disc 10 and an outside disc 11, these discs being secured together and to a hub by means of a bolt 12, a gasket 12' being disposed between discs 10 and 11 at the bolts 12. The discs 10 and 11 are spaced apart, as illustrated, and in the disc 11 there is a valve 13. The outer peripheries of the discs 10 and 11 are spaced apart and between the said discs adjacent their outer peripheries there is disposed an inner ring 14, the sides of which diverge outwardly, as illustrated at 15. A brake housing 30 is mounted on the disc 10.

Between the discs 10 and 11 and the inner ring 14, the gasket flaps 16 of an inner tube 17 are disposed, there being outer rings 18 at the outer sides of the discs 10 and 11, the outer rings 18 having offset shoe-securing flanges 19. The outer rings 18, the discs 10 and 11, the gasket flaps 16 on the inner tube 17 and the inner ring 14 have registering apertures through which are disposed bolts 20 having nuts 21, the bolts 20 and the nuts 21 serving to press the outer rings 18, the discs 10 and 11 and the gasket flaps 16 together and against the inner ring 14 to hold the parts in place, the gasket flaps 16 serving to obtain a tight joint in the space between the discs 10 and 11 and the interior of the inner tube 17. There are radially disposed openings 22 in the inner ring 14 affording communication from the space between the discs 10 and 11 and the interior of the inner tube 17. It will also be seen that the lower diverging sides 15 of the inner ring serve to cooperate with the shoe-securing flanges 19 of the outer rings 18 to hold the shoe 23 in position.

By referring to Figure 4 of the drawing it will be seen that the inner tube 17 is constructed with a recess 24 for receiving a puncture proof pad 27 around which a shoe 23 is disposed. This puncture proof pad 27 may be vulcanized to the inner tube 17, to the shoe 23 or to both the inner tube 17 and the shoe 23. The puncture proof pad 27 consisting of a plurality of blocks 28 which are formed by pressing cotton felt, or similar material, the blocks being held in position relatively to each other and relatively to the shoe 23 by rubber, or any other material, at 29. It will, therefore, be seen by referring to Figure 3 that the blocks 28 and the rubber or similar material connecting the blocks and securing the blocks together and to the shoe, will form the pad 27 which is disposed in the recess in the inner tube 17.

It will be understood that the inner tube will be inflated by air pumped through the valve 13 between the discs 10 and 11 and that this air will flow through the radially disposed apertures 22. It will also be understood that, should a leak develop in the inner tube and some air escape, the pressure in the inner tube will not be materially lessened, inasmuch as the air, which has escaped, will in a measure be replaced by the air between the discs 10 and 11 as the pressure in the wheel and in the inner tube establishes a new equilibrium. The puncture proof pad 27 and the recess 24 in the inner tube 17 will limit the air space in the inner tube, but the space between the discs 10 and 11 will hold an air supply for the inner tube. Therefore a leakage in an inner tube will not merely draw from the inner tube as limited by the recess 24 but will draw from the inner tube and also the space between the discs 10 and 11.

What is claimed is:

A wheel having inner and outer discs spaced apart, an inner ring disposed between the peripheries of the discs to clamp between the discs and the ring gasket flaps on an inner tube, two outer rings, one disposed at the outer side of each of the discs, each of the outer rings having an offset, which forms with the outer periphery of a disc a seat for the butt of a shoe, each of the rings having a shoe-securing flange, or flanges extending from the offset for engaging the outer side of the shoe for pressing the inner tube between the shoe and the inner ring, the outer rings, the discs and the inner ring having registering apertures for receiving securing means, and securing means normally disposed in the apertures.

THOMAS R. HARLAN.